(12) United States Patent
Hori

(10) Patent No.: US 6,259,478 B1
(45) Date of Patent: *Jul. 10, 2001

(54) FULL FRAME ELECTRONIC SHUTTER CAMERA

(76) Inventor: Toshikazu Hori, 1602 Swallow Dr., Sunnyvale, CA (US) 94087

( * ) Notice: Subject to any disclaimer, the term of this patent is extended or adjusted under 35 U.S.C. 154(b) by 0 days.

This patent is subject to a terminal disclaimer.

(21) Appl. No.: 08/221,721

(22) Filed: Apr. 1, 1994

(51) Int. Cl.[7] .................................................. H04N 5/335
(52) U.S. Cl. ............................................. 348/296; 348/88
(58) Field of Search ............................... 348/296, 88, 304, 348/132, 297, 125, 231, 305–314; 250/208.1

(56) References Cited

U.S. PATENT DOCUMENTS

| | | | |
|---|---|---|---|
| 4,531,156 | * 7/1985 | Nishizawa et al. | 348/307 |
| 4,794,453 | * 12/1988 | Gnuechtel et al. | 348/88 |
| 4,851,915 | * 7/1989 | Yang et al. | 348/296 |
| 4,896,211 | * 1/1990 | Hunt et al. | 348/132 |
| 5,153,730 | * 10/1992 | Nagasaki et al. | 348/231 |
| 5,298,734 | * 3/1994 | Kokubo | 250/208.1 |

* cited by examiner

Primary Examiner—Wendy Garber
Assistant Examiner—Andrew B. Christensen

(57) ABSTRACT

An electronic shutter camera with full frame resolution employs a progressively scanned interline transfer charge coupled device for generating full frame images of objects moving past an observation point either asynchronously in response to an external trigger signal or synchronously with internal timing. The image charges accumulated on the pixel regions of the CCD are discharged once per frame time, and the pixel regions are also initially discharged prior to the beginning of an image charge integration period to remove noise. A special double pulse mode enables the shutter speed to be specified by externally generated double trigger pulses, with the spacing between pulses specifying the desired shutter time. Manual selection of a wide range of shutter speeds is also provided. Each image frame is stored in a digital memory and is output as either interlaced or non-interlaced analog or digital video.

19 Claims, 4 Drawing Sheets

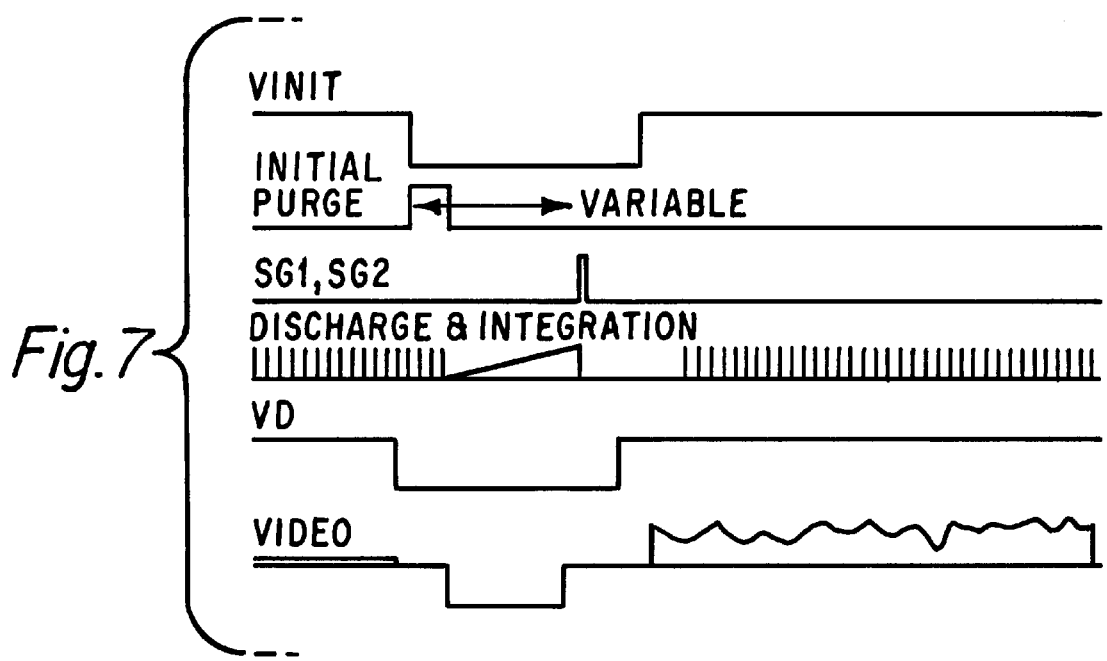
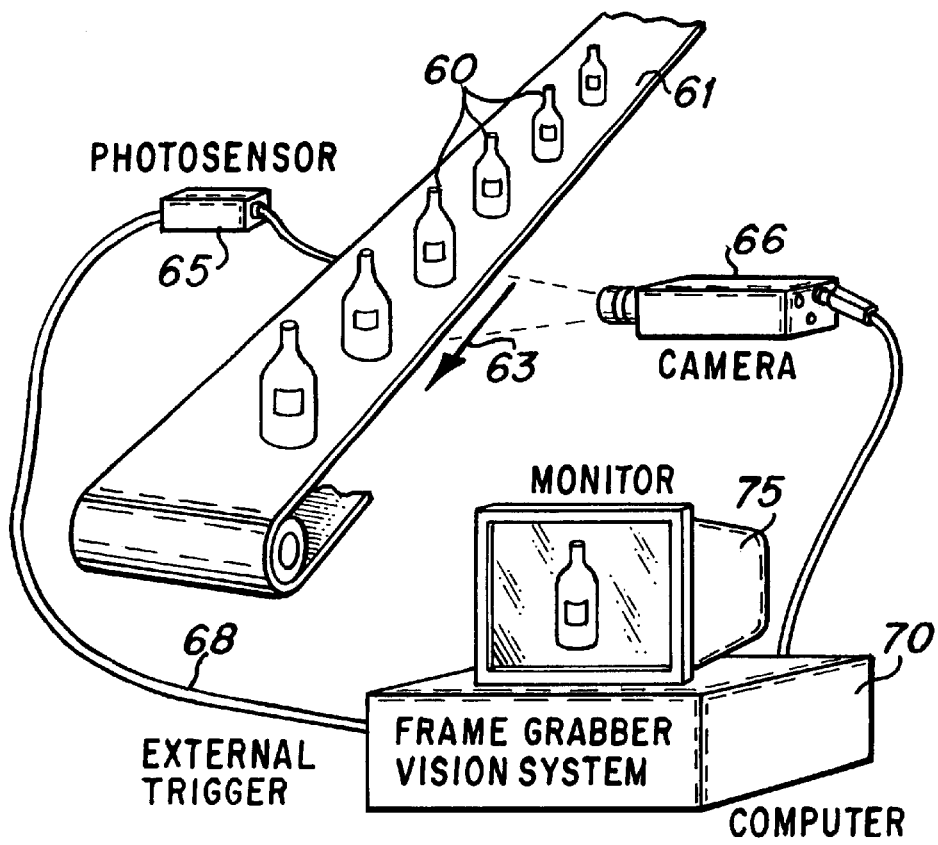

FULL FRAME ELECTRONIC SHUTTER CAMERA

BACKGROUND OF THE INVENTION

This invention relates to video imaging devices used to capture images of objects on a sequential basis. More particularly, this invention relates to triggered image capturing devices using a camera with solid state video imaging technology.

Solid state video imaging devices are known which are designed to capture still images of objects in a time sequential manner. Such devices are usually triggered either internally or externally by means of trigger pulses, which are either generated on a regular periodic basis or in response to the external generation of a trigger pulse in response to the passage of an object past a triggering point. Typical uses of such devices are in industrial applications in which it is desired to capture static images of moving objects along an assembly line, a conveyor belt or the like.

In known systems, a video camera using a charge coupled device (CCD) imaging element is installed at an observation point and is triggered either on a regular timed interval or in response to a triggering signal generated by a monitoring device (such as a photoelectric sensor) whenever an object is properly positioned in the observation area. In response to the trigger signal, an electronic image is captured by the CCD in the form of stored charges which are then converted into appropriate analog video signals. These video signals are then processed by follow on signal processing circuitry external to the camera and subsequently coupled to appropriate display and storage devices, such as a video monitor, a video tape recorder or the like.

While effective in many applications, known CCD based systems suffer from limited image resolution due to two factors. The first factor is inherent in the construction of conventional CCD video cameras with CCD elements having a lateral overflow drain structure. At the beginning of each imaging cycle, any charges accumulated in each pixel region of the CCD imaging element must initially be discharged prior to beginning development of the desired image (to remove background noise). With CCD devices having lateral overflow drain structure, the duration of the minimum discharge period is such that the practical shutter speed is limited to about $1/2000$th second. For application requiring a faster shutter speed, such as objects traveling along a belt conveyor at a rapid speed or on-line inspection installations, the required shutter speed ranges from a minimum of $1/4000$th second to $1/30000$th second in order to provide a static image of the moving object with sufficient resolution. The second factor lies in the normal format arrangement employed in conventional CCD video cameras: such cameras typically produce video in an interlaced format in which each frame is divided into two successive fields, as in the standard NTSC video signal format. With this type of video formatting, the resolution obtained for each image is only that of one field, which is approximately one-half the resolution of a full frame. Thus, even if the initial discharge period of such devices were somehow decreased by an amount sufficient to permit shutter speeds in the required range, the resolution of the image obtained would not meet the quality standards required for many applications.

Efforts to date to design electronically shuttered solid state video imaging devices devoid of the above disadvantages have not met with success to date.

SUMMARY OF THE INVENTION

The invention comprises a solid state video imaging device with improved image resolution, which is capable of relatively fast shutter speeds over a wide range and which provides full frame resolution for a captured image, interlaced or non-interlaced video output signals, and an externally controllable shutter speed.

In its broadest aspect, the invention comprises an electronic shutter camera with full frame resolution comprising a progressive scanning interline transfer charge coupled device (CCD) for imaging a frame of information; timing means for generating electronic shutter signals for controlling the scanning and charge transfer rate for the CCD; control means for resetting the timing means; memory means for storing a full frame image from the CCD; and means for converting the full frame image to video signals having a selected format. The CCD preferably has a vertical overflow drain structure.

The control means may alternatively include manually selectable means for specifying the shutter speed, or means responsive to a pair of externally supplied pulses for selecting the shutter speed in accordance with the time separation between preselected portions of the pair of externally supplied pulses.

The converting means preferably includes means for outputting the frame image as either interlaced successive fields of video information or as a non-interlaced frame of video information.

The control means further preferably includes means responsive to an externally supplied asynchronous reset signal for resetting the timing means.

The memory means preferably comprises a digital storage device having a memory capacity of at least one frame of information, and an analog to digital converter coupled between the CCD and the digital storage device for converting the CCD analog output signals to digital equivalent signals.

The converting means preferably includes a digital to analog converter coupled to the digital storage device for converting digital equivalent signals stored in the digital storage device to analog video output signals. The converting means preferably further includes means for accessing the digital equivalent signals in the digital storage device in either a pixel sequential alternate line sequential order or a pixel sequential line sequential order, so that the analog video output signals are output respectively in interlaced format as odd and even fields or output in a non-interlaced format.

For a fuller understanding of the nature and advantages of the invention, reference should be had to the ensuing detailed description taken in conjunction with the accompanying drawings.

BRIEF DESCRIPTION OF THE DRAWINGS

FIG. 7 is a timing diagram illustrating the fast reset mode of operations; and

FIG. 8 is a schematic diagram illustrating an application of the invention.

DETAILED DESCRIPTION OF THE PREFERRED EMBODIMENTS

Figure 1:
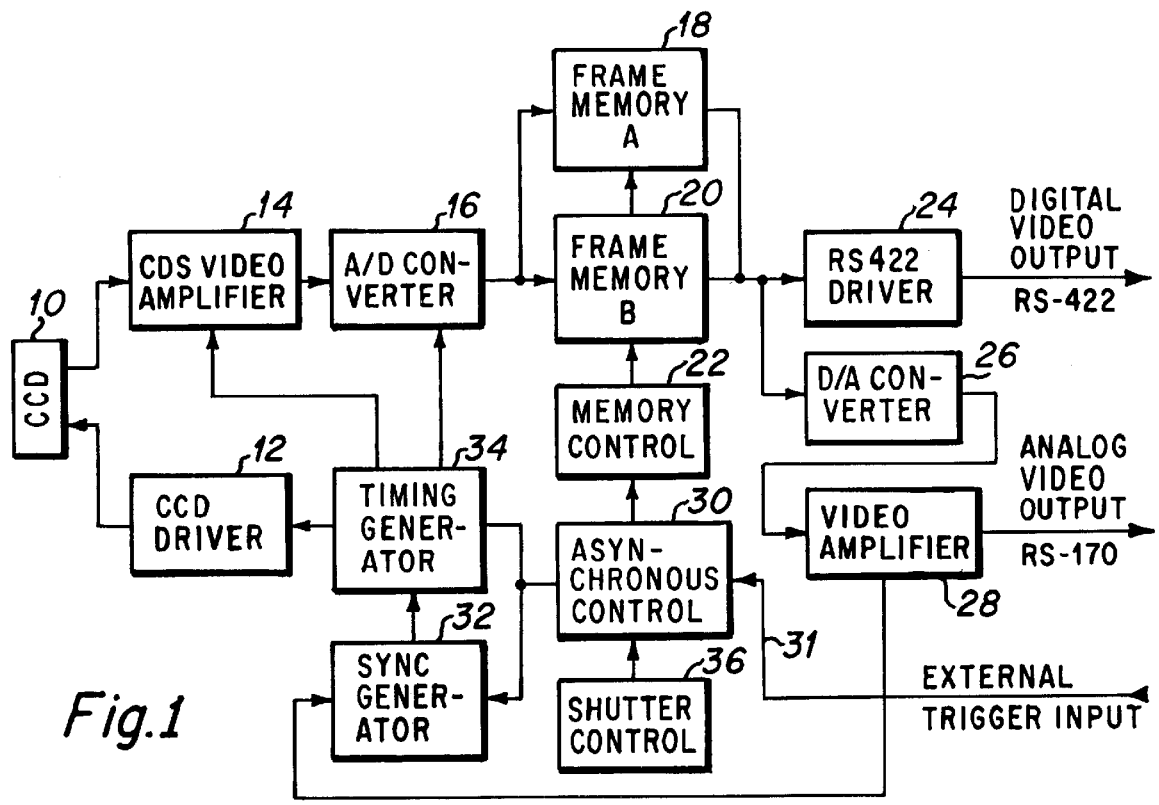
FIG. 1 is a block diagram of the preferred embodiment of the invention.

Turning now to the drawings, FIG. 1 is a block diagram of a full frame shutter camera system according to the invention. As seen in this Fig., a charged coupled device 10 driven directly by a CCD driver unit 12 has an output coupled to a CDS/video amplifier unit 14. Charged coupled device 10 is an interline transfer CCD of known design having vertical shift registers adjacent each photosensitive pixel area and associated transfer gates for transferring charges accumulated during an exposure period in parallel from each pixel area to the associated vertical shift registers. Thus, all pixels are exposed simultaneously for the exposure period, and the entire image composed of individual pixels is captured for each operation of the shutter. CCD 10 is preferably a type KAI-0370 series image sensor progressive scan interline CCD available from Eastman Kodak Company of Rochester, N.Y. This device has a vertical overflow drain structure, and provides low dark current, high output sensitivity, negligible lag and low smear. In addition, this device provides full line resolution for each image capture, which allows for imaging of fast moving objects without breakup of the image due to successive field capture. Other specific model devices may occur to those of ordinary skill in the art.

Figure 2:
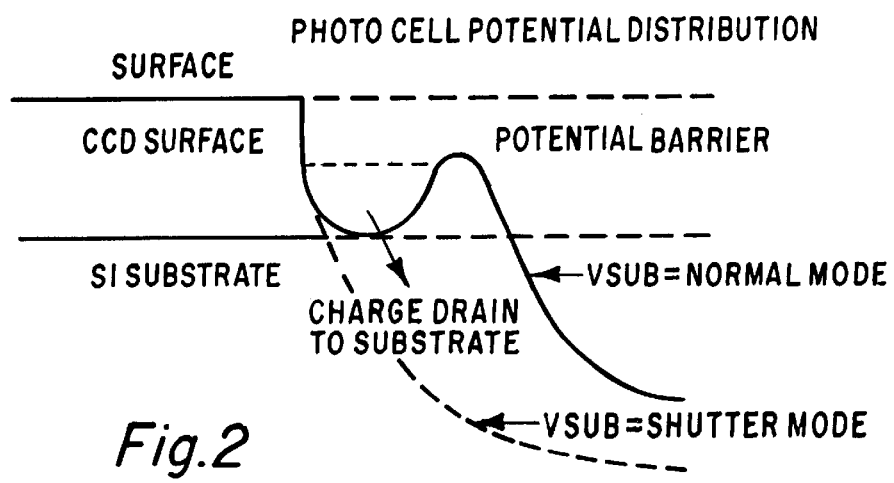
FIG. 2 is a schematic diagram illustrating the operation of an interline transfer CCD with vertical overflow drain structure.

With reference to FIG. 2, which illustrates the vertical overflow drain structure, when the drain bias is applied, the CCD charges developed in each pixel area are drained to the substrate vertically. Since the substrate is uniformly biased below all pixel regions, even a very short period discharge pulse is capable of draining these areas simultaneously. When the drain bias is returned to a normal level, the CCD starts integrating charges in each pixel area or region until the transfer gate is opened to move the charges to the associated shift registers (not illustrated). This period is the shutter speed or exposure time.

Returning to FIG. 1, CDS/video amplifier unit 14 includes a collated double sample and hold circuit for capturing the output of the shift registers in CCD 10, as well as a video amplifier for amplifying the samples. The output of Unit 14 is coupled to a conventional analog to digital converter 16 in which the analog video output of Unit 14 is converted to digital form. The digital samples output from analog to digital converter 16 are supplied to a memory unit comprised of two memory sections 18, 20 for storing alternate lines of a captured video image in digital form. Thus, for example, memory section 18 may store all the odd lines of the progressively scanned image, while memory section 20 will store all the even lines. The memory unit composed of sections 18, 20 is controlled by a memory control unit 22. The output of the memory unit composed of memory sections 18 and 20 is coupled to an RS 422 driver circuit 24 to provide digital video output, and also to the input of a digital to analog converter unit 26, whose output is coupled to the input of a conventional video amplifier 28. The output of video amplifier 28 is RS-170 analog video. Thus, depending on the desired output format, each frame image may be output as either non-interlaced progressively scanned video in non-interlaced digital or analog video form, or interlaced video in digital or analog video form. The selection of the video type is controlled by memory control unit 22, which is driven by signals generated by an asynchronous control unit 30. Asynchronous control unit 30 generates not only control signals for the operating memory control unit 22 but also control signals for a conventional sync generator 32 used to drive video amplifier 28 and a timing generator 34, which is used to generate conventional timing signals to operate the CCD driver unit 12, CDS/video amplifier unit 14 and A/D converter 16. A manually operable shutter control unit 36 having a set of manually operable controls provides control signals to asynchronous control unit 30 specifying the type of shutter control and mode of operation, in a manner more fully described below. In addition, asynchronous control unit 30 is provided with an external trigger signal input for receiving externally generated trigger signals used to time the initiation of the image captured, when the system is operated in the external trigger mode, including a special double pulse mode described below.

Figure 3:
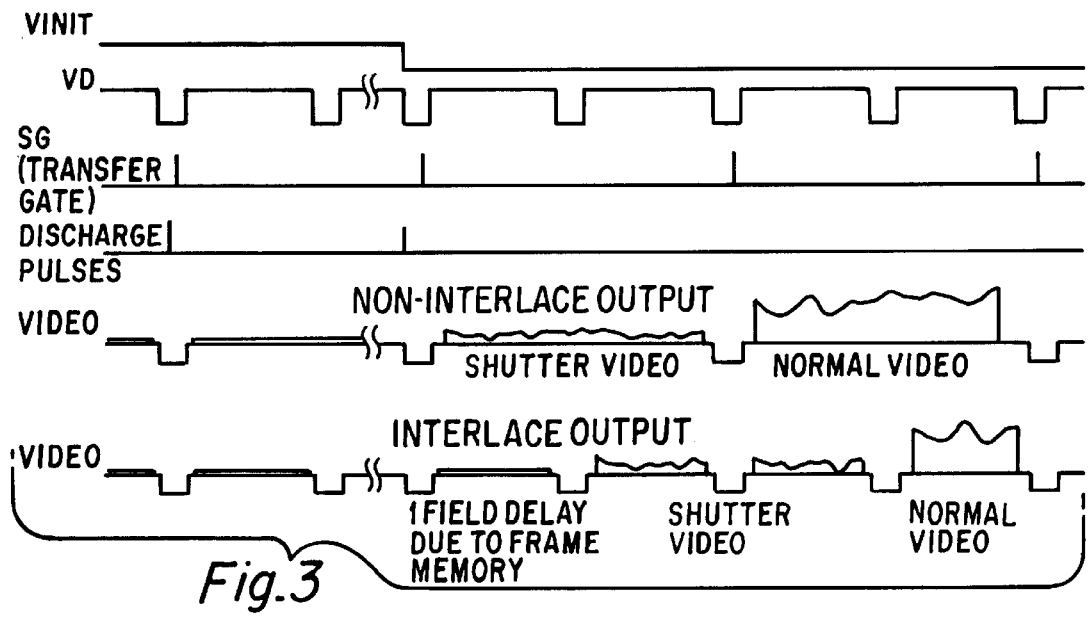
FIG. 3 is a timing diagram illustrating shutter control timing.

FIG. 3 illustrates the shutter control operation of the preferred embodiment of the invention. In this figure, the uppermost control signal line termed VINIT is a binary control signal which is either generated internally or supplied from a source external to the camera system to the asynchronous control unit 30 via control input terminal 31. As seen in this figure, the VINIT signal is a binary signal having two states. The initial state in the figure represents the enabled state while the later low state represents the disabled state. The transition edge between the enabled and disabled states is the reset timing portion of the VINIT signal. The second signal in FIG. 3 is a periodic pulse signal VD from the sync generator unit 32 which has a repetition rate equal to the field rate of normal video, which is twice the frame rate. The signal immediately below the sync generator pulse is a pulse signal SG generated by CCD driver unit 12 and which opens the transfer gates in CCD 10 for a period which is at least as long as the minimum interval required to transfer all of the charges from the individual pixel regions into the associated vertical shift registers. As seen from FIG. 3, the repetition rate of the SG pulses is one pulse per frame of video timing (two fields). The signal immediately below the SG signal is the discharge pulse control signal generated by CCD driver 12 and used to discharge each pixel region of CCD 10 on a periodic basis until the reset timing portion of the VINIT signal signifies the start of a charge accumulation operation in CCD 10. In operation, when the VINIT signal is at the enabled level, the discharge pulses periodically discharge the individual pixel regions of the CCD 10. Once the trigger edge appears, the camera timing generator 34 is reset along with sync generator 32 and the CCD 10 starts integrating image charges for the shutter period. At the end of this integration period, all accumulated charges are transferred to the vertical shift registers in CCD 10 in response to the appearance of the SG transfer gate pulse.

The shutter period can be controlled either internally by means of shutter control unit 36 or externally by means of a double pulse input trigger signal described below. By way of timing reference, FIG. 3 also illustrates the analog video output from video amp 28 for both non-interlaced output signals as well as interlaced output signals. The figure shows that the interlaced output introduces a one field delay. It should be noted that, when the VINIT control signal is in the enabled state, the camera discharges the photocharges into the substrate drain in CCD 10 even though the camera is operated on its sync timing so that black video is output. When the negative going reset pulse is applied, the camera latches the falling edge to the next horizontal drive and resets the vertical sync timing immediately. As a consequence, the horizontal phase continues uninterrupted.

Figure 4:
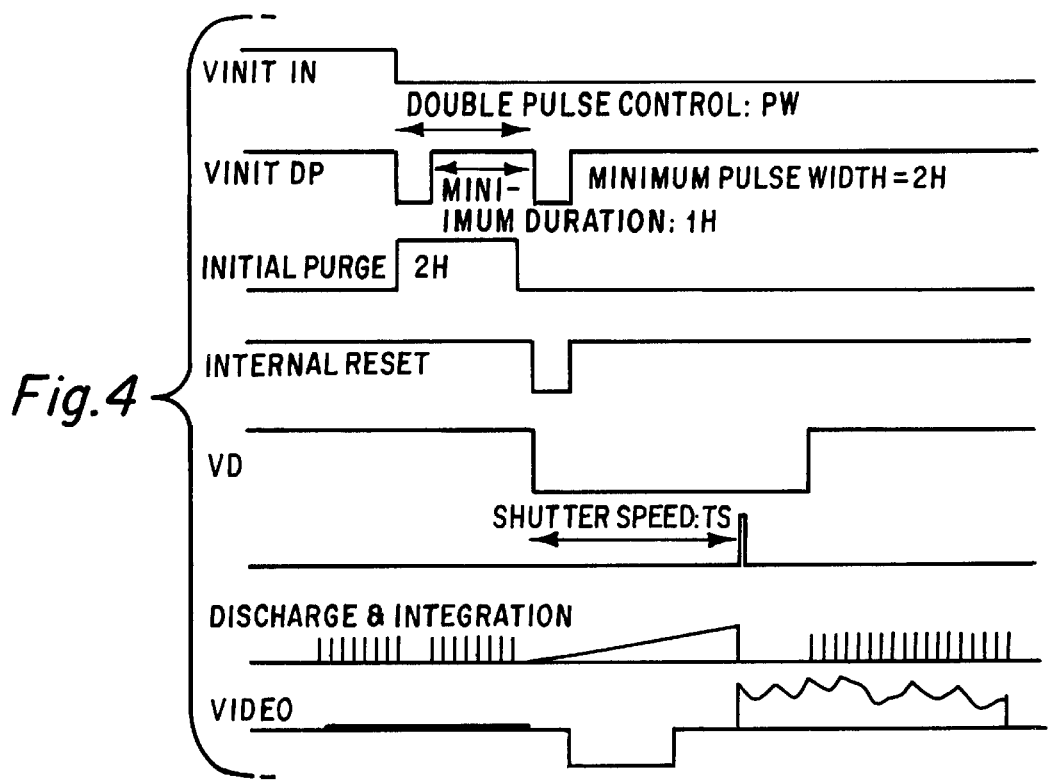
FIG. 4 is a timing diagram illustrating double pulse mode external shutter speed control.

FIG. 4 illustrates operation of the invention in the external double pulse mode in which the shutter speed is determined by the distance between successive pulses in an externally supplied double pulse signal. As seen in this Fig., the external trigger signal VINIT DP is a double pulse signal comprising negative going sharp edged pulses. The separation distance between the leading edges of the first and second pulses specifies the shutter speed (i.e., the total image charge integration time). In the preferred embodiment, the shutter speed is predetermined as follows:

$$\text{shutter speed } (ts) = x + 10H - 19H$$

where H=63.5 microseconds (duration of one entire horizontal line). The fastest shutter speed is selected when the second pulse occurs 10H from the first pulse leading edge. In this case, the shutter speed is (10H+10H−19H)=63.5 microseconds=$1/16,000$ second. In contrast, for the much slower speed of $1/1,000$ second (equal to 16H), the second pulse is located at 25H from the first pulse leading edge. It should be noted that the minimum duration of the distance between the trailing edge of the first pulse and leading of the second pulse is 1H, and that the minimum width of either pulse is 2H.

In operation, the appearance of the trigger edge in another externally generated signal termed VINIT IN commences an initial purge for a period of 9H. Thereafter, at the leading edge of the second pulse, the system timing is reset and the CCD 10 starts integrating charges for the period of time specified by the equation noted above for shutter speed (ts). At the end of the shutter period, all charges are transferred to the vertical shift registers in CCD 10 and are further processed in the manner described above.

Figure 5:
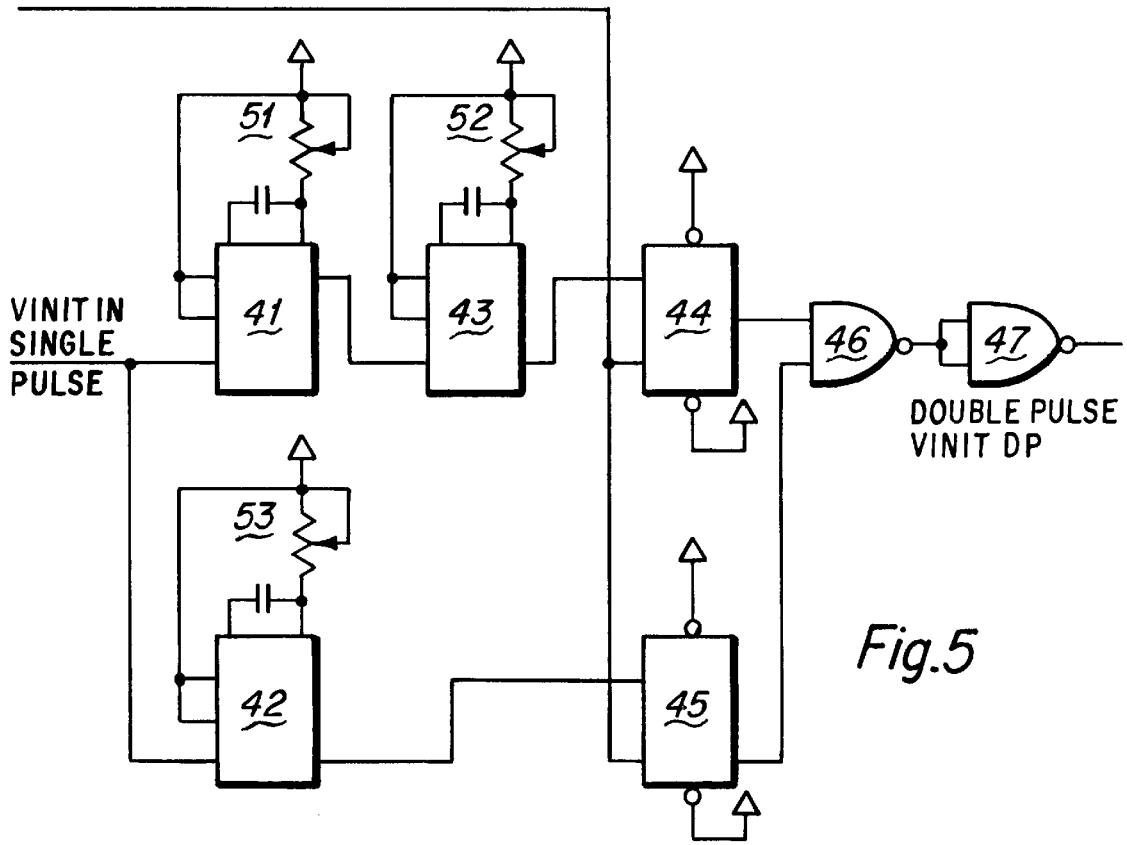
FIG. 5 is a logic diagram of a double pulse generator.

FIG. 5 illustrates a preferred circuit for use in generating the double pulse signal VINIT DP described above and shown in FIG. 4. As seen in FIG. 5, the external trigger signal VINIT IN is coupled to the data input of a pair of one shot circuits 41, 42. The output of one shot circuit 41 is coupled to the input of a third one shot circuit 43. The output of one shot circuit 43 is coupled to the data input of a flipflop 44. The data output of one shot 42 is coupled to the data input of a second flipflop 45. The reset input of flipflops 44, 45 is supplied with a horizontal drive signal HD from a sync generator. The data outputs of flipflops 44, 45 are coupled through a pair of NAND gates 46, 47. The output of gate 47 is the double pulse VINIT DP trigger signal described above with reference to FIG. 4.

One shots 41–43 are each provided with a variable resistor 51–53, respectively, which are individually used to set the pulse timing parameters. Variable resistance 51 is used to adjust the pulse separation duration, i.e., the distance between the trailing edge of the first pulse and leading edge of the second pulse. Variable resistance 52 is used to adjust the width of the second pulse. Variable resistance 53 is used to adjust the width of the first pulse. This width should be less than 4H in order to obtain effective shutter speed control, and the optimum value has been determined to be 2H. With respect to the width of the second pulse, this width should be enough to enable reliable frame grab timing, which in the preferred embodiment is suggested to be greater than 2H. It should be noted that the VINIT DP signal provides the shutter speed control and also creates internal VD and frame grab timing for the asynchronously reset video signals generated by the camera system.

Figure 6:
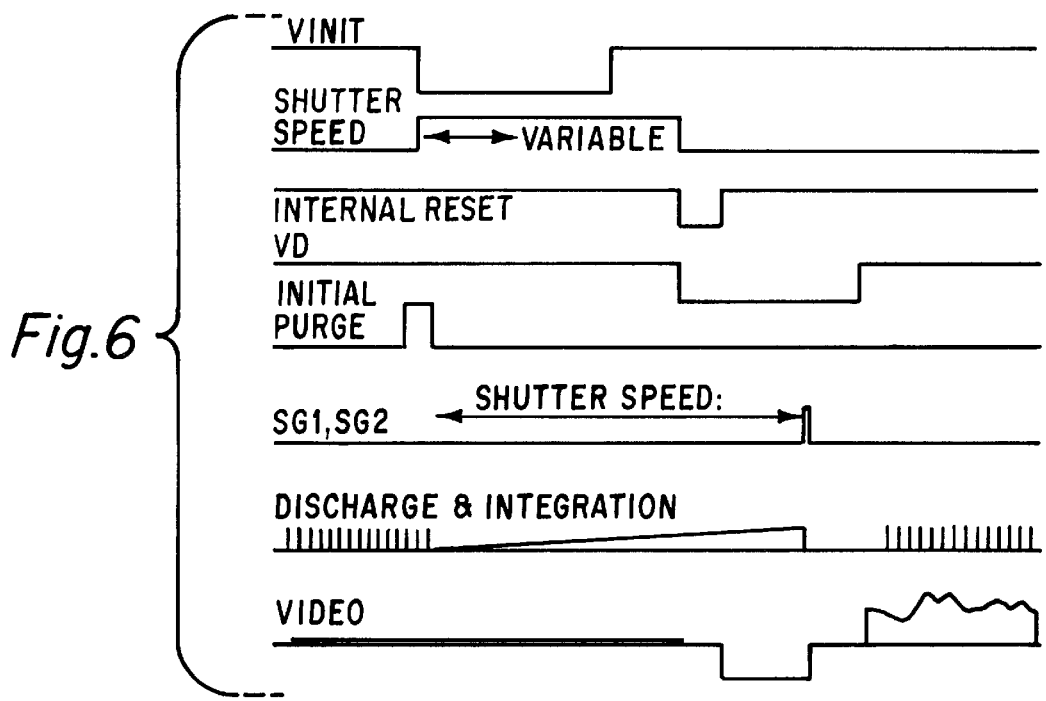
FIG. 6 is a timing diagram illustrating the internal slow reset mode of operation.

FIG. 6 illustrates another mode of operation termed "internal slow reset mode." In this mode, the camera operates the reset time and length of the shutter period in a manner similar to that described with reference to the external double pulse mode but using the internally generated VINIT signal in combination with switch control signals. The shutter speed is controlled by setting a dial switch in the shutter control unit 36 to one of four values, which in the preferred embodiment are $1/2000$th, $1/4000$th, $1/8000$th and $1/16000$th second. When the VINIT signal is generated and the leading edge occurs, an internal shutter speed signal is latched to horizontal drive: the trailing edge of VINIT determines the timing length of the shutter speed. The integration of the image charges begins immediately after the leading edge of VINIT signal, and the video output timing begins slightly after the falling edge of the shutter speed signal.

FIG. 7 illustrates another mode of operation termed the internal fast rest mode in which the camera periodically resets using the VINIT internal trigger signal, which is latched to the horizontal drive signal HD (not illustrated). The video output is also synchronized with the internally generated VINIT trigger signal. The shutter speed is controlled by setting the dial switch in shutter control unit 36 to one of four settings, which in the preferred embodiment provide shutter speeds of $1/125$th, $1/250$th, $1/500$th and $1/1000$th second.

Table 1 below lists the various settings of the dial switch located in shutter control unit 36 in two modes of operation. As can be seen in the table, there are ten switch settings for specifying the shutter speed and there are two different basic modes of operation, viz. the manual shutter mode and the asynchronous reset mode. Selection between manual shutter mode and asynchronous reset mode is determined by a jumper (not illustrated), which is shown in the Appendix to this application as jumper W1. The setting 0 specifies no shutter operation. Settings 1 through 8 specify the shutter period duration. Note that the shutter period settings for the manual shutter mode and the asynchronous reset mode are in mutually inverse order. Setting 9 is the setting used to specify operation in the double pulse mode.

TABLE 1

| | Shutter Control Switch | |
|---|---|---|
| | Manual shutter mode | Async reset mode |
| 0 | no shutter | no shutter |
| 1 | 1/125 | 1.0 H 1/16000 |
| 2 | 1/250 | 2.0 H 1/8000 |
| 3 | 1/500 | 4.0 H 1/4000 |
| 4 | 1/1000 | 8.0 H 1/2000 |
| 5 | 1/2000 | 16 H 1/1000 |
| 6 | 1/4000 | 32 H 1/500 |
| 7 | 1/8000 | 64 H 1/250 |
| 8 | 1/16000 | 128 H 1/125 |
| 9 | N/C | Shutter determined by double pulse |

Mode 1: Normal mode
Mode 1–4: Fast mode
Mode 5–8: Slow mode
Mode 9: Double pulse mode As will now be apparent, the invention provides a full frame electronic shutter camera having several useful modes of operation. In particular, the camera can be used with completely internal shutter timing, or with externally supplied trigger initiation, for a wide variety of shutter speeds. In addition, the double pulse mode enables the shutter timing to be externally specified by a suitable source, such as a computer incorporated into an object monitoring system. With reference to FIG. 8, which shows an application of the invention in an asynchronous object scanning system, bottles 60 on a moving conveyor belt 61 moving in the direction of arrow 63 travel past a sensing station 65 capable of detecting the arrival of a given bottle 60 at a location at which an image of the bottle can be captured by camera 66 incorporating the invention. As each bottle 60 reaches the observation point, photosensor 65 generates an external trigger signal which is supplied as the external trigger input to the system shown in FIG. 1. More specifically, the output of photosensor 65 is supplied via a cable 68 to a computer 70 which generates the external VINIT trigger signal for camera 66 and also the double pulse signal VINIT DP when the camera 66 is operated in the double pulse mode. It should be noted that, in the double pulse mode, the horizontal drive signals within camera 66 must be synchronized with the horizontal drive signal within computer 70 used to generate the double pulse trigger signal. The video output from camera 66 is then displayed on a monitor 75.

Appendix 1 attached hereto is a set of circuit schematics illustrating a specific preferred embodiment of the invention.

While the above provides a full and complete disclosure of the preferred embodiments of the invention, various modifications, alternate constructions and equivalents will occur to those skilled in the art. For example, while FIG. 5 shows a specific example of a double pulse generation circuit, other circuits may be designed having the same function. In addition, while specific shutter speeds have been described above, other shutter speeds may be employed, depending on the specific applications of the invention. Therefore, the above should not be construed as limiting the invention, which is defined by the appended claims.

What is claimed is:

1. An electronic shutter camera with full frame resolution, said camera comprising:
   a progressive scanning interline transfer charge coupled device (CCD) for imaging a frame of information;
   timing means for generating electronic shutter signals for controlling the scanning and charge transfer rate for said CCD;
   sync generator means for generating video timing signals;
   control means for resetting said timing means and said sync generator means, said control means including means for selecting an internal reset mode and an external reset mode of operation for said timing means and said sync generator means, said control means further including means responsive to an externally supplied asynchronous reset signal for resetting said timing means and said sync generator means;
   digital image generating means coupled to said CCD for generating multiple bit digital image signals;
   individual memory means coupled to said digital image generating means for storing a full frame multi-bit digital image; and
   means for converting said full frame multi-bit digital image to video signals having a selected format.

2. The invention of claim 1 wherein said CCD has a vertical overflow drain structure.

3. The invention of claim 1 wherein said control means includes manually selectable means for specifying the shutter speed.

4. The invention of claim 1 wherein said control means includes means responsive to a pair of externally supplied pulses for selecting the shutter speed in accordance with the time separation between preselected portions of said pair of externally supplied pulses.

5. The invention of claim 1 wherein said converting means includes means for outputting said frame image as interlaced successive fields of video information.

6. The invention of claim 1 wherein said converting means includes means for outputting said frame image as a non-interlaced frame of video information.

7. The invention of claim 1 wherein said individual memory means comprises a digital storage device having a memory capacity of at least one frame of information, and an analog to digital converter coupled between said CCD and said digital storage device for converting CCD analog output signals to digital equivalent signals.

8. The invention of claim 7 wherein said converting means includes a digital to analog converter coupled to said digital storage device for converting digital equivalent signals stored in said digital storage device to analog video output signals.

9. The invention of claim 7 wherein said converting means includes means for accessing said digital equivalent signals in said digital storage device in a pixel sequential alternate line sequential order so that said analog video output signals are output in interlaced format as odd and even fields.

10. The invention of claim 7 wherein said converting means includes means for accessing said digital equivalent signals in said digital storage device in pixel sequential line sequential order so that said analog video output signals are output in non-interlaced format.

11. An electronic shutter camera with full-frame resolution, said camera comprising:
    a progressive scanning interline transfer charge coupled device (CCD) for imaging a frame of information;
    timing means for generating electronic shutter signals for controlling the scanning and charge transfer rate for said CCD;
    sync generator means for generating video timing signals;
    control means for resetting said timing means and said sync generator means;
    digital image generating means coupled to said CCD for generating multiple bit digital image signals;
    individual memory means coupled to said digital image generating means for storing a full-frame multi-bit digital image; and
    means for converting a full-frame multi-bit digital image to video signals having a selected format,
    said timing means, said sync generator means, said control means, said memory means and said converting means all being located within the camera.

12. An electronic shutter camera with full-frame resolution, said camera comprising:
    a progressive scanning interline transfer charge coupled device (CCD) for imaging a frame of information;
    timing means for generating electronic shutter signals for controlling the scanning and charge transfer rate for said CCD;
    sync generator means for generating video timing signals;
    control means for resetting said timing means and said sync generator means in response to the receipt of an externally supplied asynchronous reset signal, said control means including means responsive to a pair of externally supplied pulses for selecting the shutter speed in accordance with the time separation between pre-selected portions of said pair of externally supplied pulses; and
    means for converting individual lines of said frame of information to video signals having a selected format.

13. The invention of claim 12 wherein said converting means includes means for outputting said individual lines of said frame of information to an interlaced video format.

14. The invention of claim 12 wherein said converting means includes means for outputting said individual lines of said frame of information to a non-interlaced video format.

15. The invention of claim 12 further including digital image generating means coupled to said CCD for generating multiple bit digital image signals; and wherein said converting means includes individual memory means coupled to said digital image generating means for storing a full-frame multi-bit digital image.

16. The invention of claim 15 wherein said memory means comprises a digital storage device having a memory capacity of at least one frame of information, and wherein said digital image generating means includes an analog to digital converter coupled between said CCD and said digital storage device for converting CCD analog output signals to digital equivalent signals.

17. The invention of the claim 16 wherein said converting means includes a digital to analog converter coupled to said digital storage device for converting digital equivalent signals stored in said digital storage device to analog video output signals.

18. The invention of claim 16 wherein said converting means includes means for accessing said digital equivalent signals in said digital storage device in a pixel sequential alternative line sequential order so that said analog video output signals are output in interlaced format as odd and even fields.

19. The invention of claim 16 wherein said converting means includes means for accessing said digital equivalent signals in said digital storage device in pixel sequential line sequential order so that said analog video output signals are output in non-interlaced format.

* * * * *